Patented Oct. 16, 1923.

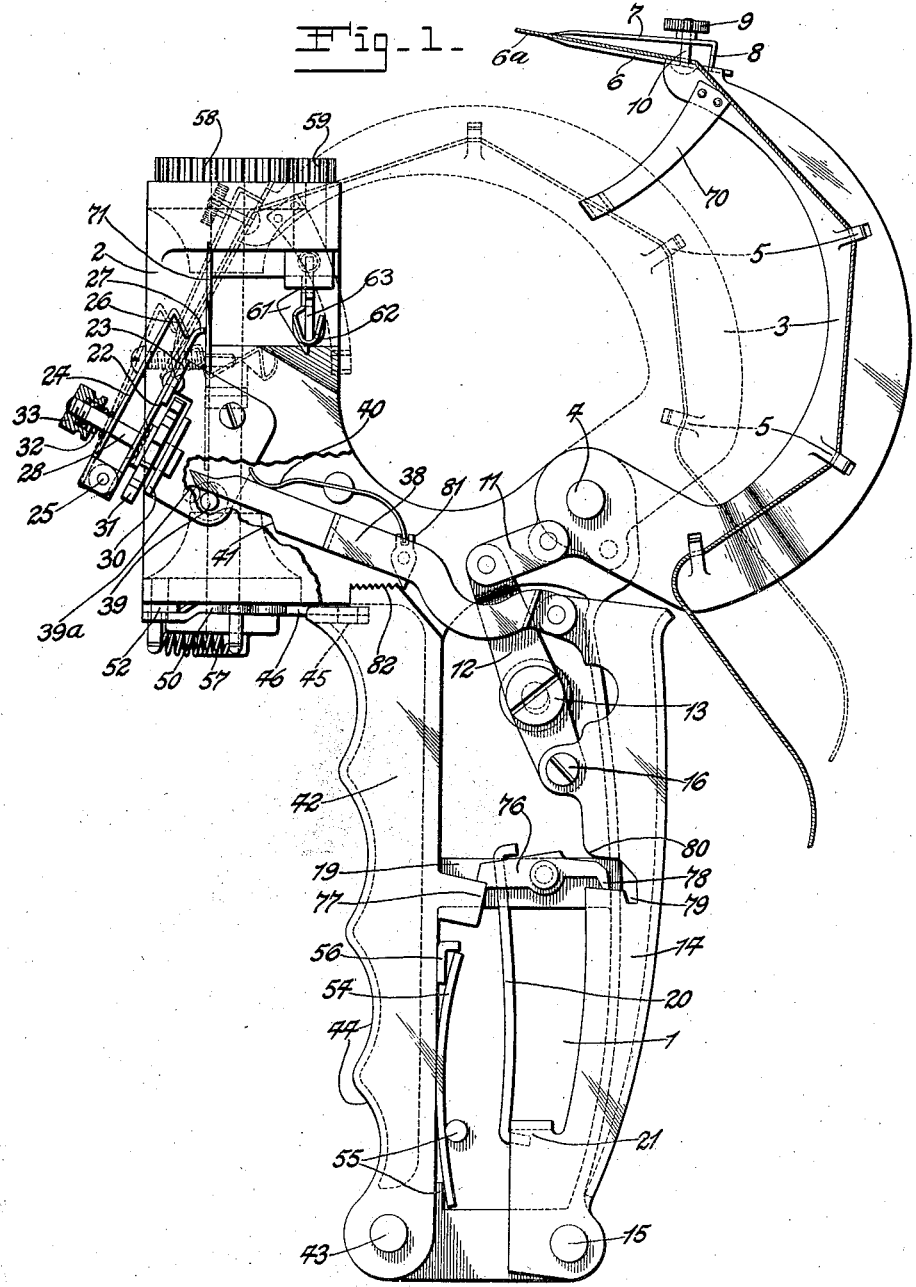

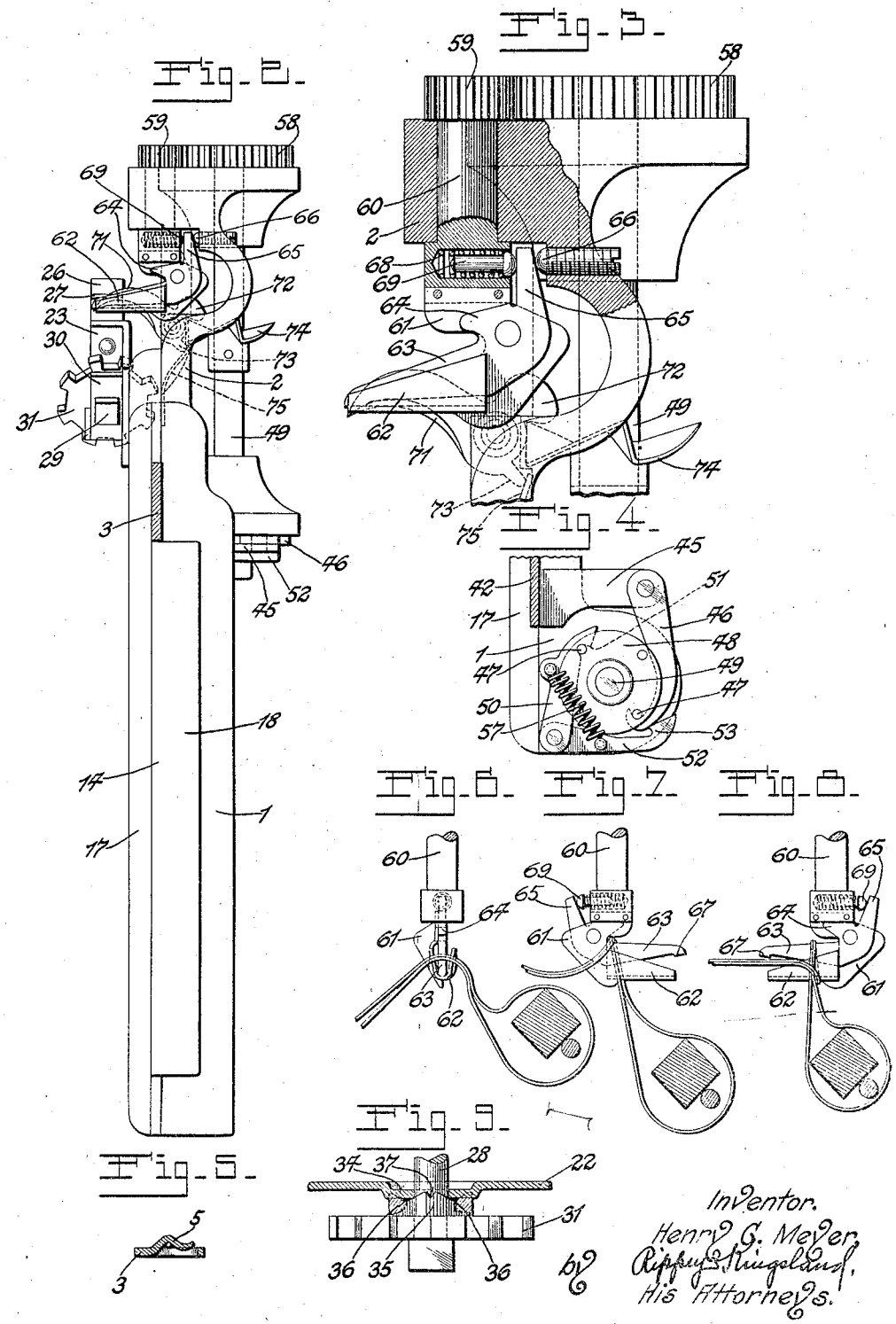

1,470,861

UNITED STATES PATENT OFFICE.

HENRY C. MEYER, OF BLACK JACK, MISSOURI.

TYING MACHINE.

Application filed March 13, 1922. Serial No. 543,245.

*To all whom it may concern:*

Be it known that I, HENRY C. MEYER, a citizen of the United States, residing at Black Jack, St. Louis County, Missouri, have invented a new and useful Tying Machine, of which the following is a specification.

This invention relates to tying machines, and has particular reference to such machines adapted for portable and manual operation to tie twine or the like, around vines, etc., to secure them to wires, supporting poles, trellises, etc.

An object of the invention is to provide such a machine that may be easily carried in the hand and manually operated to tie twine around vines and the supports therefor to support the vines; such, for instance, as tomato vines and other vines of that character, or grape vines, and the like.

Another object of the invention is to provide such a machine of small and comparatively inexpensive and strong construction and adapted for rapid operation to avoid the slow and laborious custom now generally followed of tying the vines up by hand.

Other objects will appear from the following description, reference being made to the drawing, in which—

Fig. 1 is an elevation with the cover plate for the handle and for a part of the operating mechanism removed and a part of the supporting frame being broken away.

Fig. 2 is an edge view looking toward the right hand side of the machine as shown in Fig. 1, the pivoted operating finger being in section and the cover plate being in position.

Fig. 3 is an enlarged view with parts in section showing the knot tying mechansm.

Fig. 4 is a view showing details of a part of the operating mechanism for the knot tying mechanism.

Fig. 5 is a sectional view of the pivoted finger that carries the string to the knotter.

Fig. 6 is a view showing one position of the knotter having the string in connection therewith.

Fig. 7 is a view showing the knotter in a position at an angle of 90° from the position shown in Fig. 6.

Fig. 8 is a view showing the knotter turned around 270° from the position shown in Fig. 6.

Fig. 9 is a detail view showing the construction of the device for controlling the tension of the stationary twine clamp.

The frame of the machine comprises a handle portion 1 and an arm 2. A long curved arm 3 is mounted on a pivot 4 at one end of the handle and is operable to move the twine, first to the clamp by which the twine is engaged and held in position to be passed around the vine and its support, and then to the knotter by which the twine is tied. The arm 3 is formed with a number of fingers 5 for engaging and guiding the twine which passes to a clamp device extending from the end of the arm. The clamp on the swinging arm is herein called the movable clamp. In the form shown the movable clamp includes a resilient extended portion 6 of the arm 3, and a cooperating resilient member comprising a leaf spring bent to provide a clamping portion 7, and a supporting portion 8. The supporting portion 8 is inter-locked with the part 6 thereby supporting the part 7 in position to utilize the resiliency thereof to cooperate with the part 6 to engage the twine. The resiliency of the member 7 of the clamp may be varied by adjustment of a nut 9 on a stem 10 that passes through the members 6 and 7. The twine retained under the guide fingers 5 is passed through the space between the parts 8 and 10 and thence between the contacting ends of the clamp members 6 and 7.

Swinging movement is imparted to the arm 3 as required to move the twine to position for engagement by a stationary clamp that holds the twine while the twine is being passed around the vine and its support, after which swinging movement is imparted to said arm to move the twine into engagement with the knotter.

As shown, a link 11 pivotally connects the arm 3 with a lever 12 pivoted on a support 13 in connection with the handle portion 1. An actuator for the lever 12 comprises a lever 14 having one end pivoted on a support 15 on the handle portion 1 of the frame, and having a pivot connection 16 with the lever 12. The lever 14 operates within a slot or opening between the handle portion 1 and the cover plate 17 that forms a part of the handle and covers the operative mechanism mounted in the handle. A wide flange 18 on the outer edge of the lever 14 serves to protect the lever 14 from hurting the hand of the user when the lever 14 is operated. By gripping the handle and imparting sufficient pressure to the lever 14, said lever will be operated to cause the lever 12 and the connecting link 11 to swing the arm 3 as required to carry the twine to the clamp that holds the twine in position for use. The handle portion 1 of the frame is hollow on one side and in the hollow portion thereof has a rib 19 provided with a slot in which one end of a strong spring 20 is seated. The opposite end of the spring 20 is engaged at 21 with the lever 14 and the power of said spring is exerted to actuate the other end of the lever 14 outwardly to hold the parts in the position shown in Fig. 1.

The arm 2 of the frame of the machine supports the knotter and the stationary clamp that engages and holds the twine in position to be passed around the vine and its support and for subsequent engagement by the knotter. As shown, said stationary clamp comprises a resilient plate 22 attached to a support 23 and mounted in a plane in which the clamp member 6 of the swinging clamp operates flatly against one side thereof when the swinging arm is operated to carry the twine to position for use. The co-operating member of the stationary clamp comprises a resilient plate 24 having one end pivotally connected to the plate 22 by a connection 25, and having the opposite end provided with an obliquely in-turned finger 26 that presses against the plate 22 just inwardly from the laterally curved end 27 of the plate 22. This arrangement forms a notch or guide which the pointed end of the movable clamp on the swinging arm enters when said arm is operated to move the twine to position for use. The twine is thereby forced inwardly beyond the end of the finger 26 so that as the clamp on the swinging arm is withdrawn from the stationary clamp, the twine will be held by the stationary clamp and be drawn through the guides 5 and through the movable clamp on the swinging arm as the swinging arm moves to open position shown in solid lines in Fig. 1. This is because the end of the twine after the previous operation has been left protruding from the movable clamp 6—7, as shown at 6ª (Fig. 1). The power or resiliency of the stationary clamp may be varied as desired. A rod or stem 28 has a polygonal head 29 capable of axial movement through a support 30. The support 30 permits free axial movement of the rod 28 and serves only to prevent said rod from turning. The rod or stem 28 extends through and supports a ratchet wheel 31 mounted between the plate 22 and the support 30. The rod 28 extends through both of the clamp members 22 and 24 and its outer end is encircled by a coiled spring 32 of the expansion type, the inner end of which bears against the plate 24 and the outer end of which is seated in a recess in a nut 33 screwed on the end of the rod 28. Obviously, the pressure of the spring 32 against the plate 24 and consequently the power or clamping effect of the clamp device, may be varied by adjustment of the nut 33 on the rod 28. The plate 22 is pressed to form a rib 34 that is intersected by the hole through which the rod 28 extends. The hub 35 of the wheel 31 is provided with a number of notches equalling the number of teeth on the wheel. The notches are in two series and the notches of one series alternate with the notches of the other series. The notches 36 of one series are relatively deep while the notches 37 of the other or alternating series are relatively shallow. The construction is such that as the wheel 31 is turned the notches 36 alternate with the notches 37 in entering into locking engagement with the rib 34. In Fig. 9 two of the relatively shallow notches 37 are in locking engagement with the rib 34. When the shallow notches 37 move into engagement with the rib 34 it is obvious that the clamping power of the clamp members 22 and 24 is increased, and that when the deep notches 36 are in engagement with the rib 34 the power of the clamp members is diminished. This is because the head of the rod 28 holds the wheel 31 from axial movement on the rod, and the notches 37 are closer to the spring 32 than are the notches 36. In effect, the hub 35 of the wheel 31 acts as a cam to vary the clamping power of the stationary clamp device, so that in the first movement of the swinging arm the twine will be caught and held by the stationary clamp, and in the second movement of the swinging arm, when the knotter is operated, the twine will be released. The timing of the operation is such that the greatest clamping power of the stationary clamp 22—24 is utilized to catch and hold the twine on the first movement of the swinging arm; that is, the shallow notches 37 are in engagement with the rib 34 on the first return movement of the swinging arm, while on the second return movement of the swinging arm the deep notches 36 are in engagement with the rib 34. This variation in the power of the stationary clamp is effective for the purpose for which it is provided; that is, to catch and hold the twine on the initial operation of the swinging arm so that the machine may be moved to place the twine around the vine and around the support, after which the second movement of the swinging arm moves the twine to position for engagement and tying by the knotter, but on the second movement of the swinging arm the stationary clamp is weaker than the clamp on the swinging arm so that end 6ª of the twine protruding between the clamp 6—7 after the knot has been tied and the twine cut will be withdrawn from the stationary clamp as the arm 3 moves to open position.

The device for operating the wheel 31 to control the stationary clamp is operated by the lever 14. An arm 38 has one end pivoted to the lever 14 and its opposite end pressed against a lug 39 by a leaf spring 40. When the lever 14 is pressed inwardly in opposition to the spring 20 the end of the arm 38 passes between teeth on the wheel 31. The final movement of the lever 14 causes a cam shoulder 41 on the arm 38 to operate against the lug 39 with the result that the arm 38 is moved laterally in opposition to the spring 40 and turns the wheel 31 a distance equal to one step or tooth space which is the same distance from one of the notches 36 to one of the notches 37, and vice versa. That is to say, the first inward movement of the lever 14 will turn the wheel 31 a distance sufficient to increase or to diminish the clamping effect or power of the stationary clamp, so that if the clamp is in adjustment of its greatest clamping effect the power thereof will be diminished on the first movement of the lever 14, and if the stationary clamp is in a position of diminished power, the power thereof will be increased on the first inward movement of the lever 14. The knotter is also operated from a manually operated lever 42 supported by the handle 1 of the machine. The lever 42 is pivoted to the handle at 43 and has a number of finger notches 44. A projecting arm 45 on the lever 42 pivotally supports a hook pawl 46 (Fig. 4) adapted to engage successively pins 47 projecting from a disc or wheel 48 attached to a shaft 49 journaled for rotation in the arm 2 of the machine frame.

A centering or stop pawl 50 has an abrupt shoulder 51 adapted to engage the pins 47 to prevent backward turning of the disc 48. A pawl 52 has a hook portion 53 adapted to engage the pins 47 successively upon each operation of the lever 42; that is, when the lever 42 is pressed inwardly the hook pawl 46 turns the disc 48 one-fourth of a revolution and moves from under the end of the hook pawl 52 permitting said pawl to move to position for engagement of the hook 53 with the next succeeding pin 47 to stop overthrow or excessive movement of the disc 48. When the hand pressure on the lever 42 is released, said lever is actuated outwardly by a strong spring 54 (Fig. 1) having one end portion thereof engaged with fulcrums 55 and the opposite end engaging an opposite member 56 in connection with said lever 42. This outward movement of the lever 42 causes the hook pawl 46 to disengage the pawl 52 from the pin 47 and to engage the pawl 46 with the pin that had been engaged by said pawl 52. A spring 57 connects the pawls 50 and 52 and actuates them to position to engage the pins 47. It will be seen that the pawl 50 prevents backward turning of the disc 48 but permits forward turning thereof while the pawl 52 prevents the overthrow or excessive movement of the disc 48 in a forward direction.

As stated, the shaft 49 is journaled for rotation in the extension 2 of the machine frame and the outer end of the shaft 49 has a gear wheel 58 thereon meshing with a gear wheel 59 on the knotter shaft 60, the proportions being such that the shaft 60 is turned one complete revolution on each turning movement of the shaft 49 by the lever 42, as described. The knotter is supported and actuated by the shaft 60. It will be remembered, however, that the shaft 60 ordinarily is not operated on the movement of the lever 14 to carry the twine to the stationary clamp, but ordinarily is only operated on the next movement of the lever 14 to carry the twine completely around the vine and its support.

A knotter bracket 61 is rigid with the inner end of the shaft 60 and has a channeled arm 62. The arm 62 extends considerably above the plane of the stationary clamp and also above the plane of the movement of the clamp on the swinging arm so that the twine will be in position to be engaged by the knotter of which the grooved arm 62 is a part.

The channeled or grooved side of the arm 62 is outward so that the twine will extend across the channel or groove. A gripper member 63 is pivoted to the bracket 61 and is movable into and out of the channel or groove in the arm 62, outward movement thereof being limited by a part 64 (Figs. 3 and 8) arranged to contact with a shoulder on the bracket 61. In normal or stationary position of the knotter an extension 65 of the gripper member 63 rests against an adjustable cam 66 (Fig. 3) which holds the gripper member 63 close against the arm 62 within the channel or groove therein. The outer end of the gripper member 63 is formed with a shoulder 67 behind which the twine is received so as to hold the twine more closely for the purpose of drawing the end of the twine through the loop, formed as shown in Fig. 8 to make the knot. An actuator comprising a spring 68 (Fig. 3) and a headed plunger 69 is supported by the shaft 60 and is arranged to open the knotter by moving the gripper 63 away from the arm 62 (Figs. 2 and 8) the moment the knotter is turned a sufficient distance to move the extension 65 out of contact with the cam 66. This permits the ends of the twine loop to be caught between the gripper members 62 and 63 during the final portion of the turning movement of the knotter. After the ends of the twine become caught between the gripper members, the part 65 rides upon the cam 66 to close the knotter so that when the machine is withdrawn the ends of the twine loop will be pulled through the loop and knotted.

Referring now specifically to the manner in which the knot is formed, it will be seen that the machine is first operated to stretch the twine across from the stationary clamp to the clamp on the end of the swinging arm. Next, the machine is moved to press the vine and the support therefor against the twine across the space between the end of the swinging arm and the knotter, thereby drawing the twine through the fingers 5 and through the clamps 6—7, while the end of the twine remains firmly held by the stationary clamp. This stretches the twine across the outer edges of the closed gripper members 62 and 63 after which the swinging arm is again operated to the position shown by dotted lines in Fig. 1. During this movement a finger 70 (Fig. 1) on the swinging arm 3 engages the twine passing around the vine and its support at a point between the support and the knotter to press both strands of the twine against the knotter. The finger 70 is of a formation such that it will not interfere with the operation of the knotter. After the twine has thus been positioned and while both strands of the twine are held across the knotter, about as shown in Fig. 6, the lever 42 is operated to operate the knotter. This causes the gripper members 62 and 63 to loop the twine around them, as shown in Fig. 8. Such operation also opens the gripper members 62 and 63 causing the ends of the twine to pass between them during the final movement of the knotter. Obviously, then, the ends of the twine will be firmly held between the gripper members of the knotter around which the loop is formed. Next, while the arm 3 is in the dotted position shown in Fig. 1 the machine is moved in a direction away from the looped twine to draw the knotter out of the loop, the ends of the twine still being gripped between the gripper members so that they will be drawn through the loop to complete the knot and the loop will be drawn tight as an incident to the withdrawal of the knotter from the loop. Finally, the ends of the twine will slip from between the gripper members and the machine may be removed leaving the twine tied around the vine and its support.

The twine is cut a short distance from the end of the movable clamp 6—7 automatically and as an incident to the operation described. An arcuate knife 71 is pivoted to the arm 2 of the machine frame and has arms 72 and 73 engaging opposite sides of a cam 74 attached to the shaft 49. The cam 74 has a number of high points equal to the number of the pins 47 on the disc 48. The cam 74 operates the knife 71 to cut the twine, the knife being shown in cutting position in Figs. 2 and 3 and in retracted position in Fig. 1. A spring 75 in connection with the machine frame (Figs. 2 and 3) engages the arm 73 to retract the knife when such operation is permitted by the cam 74. The construction and arrangement is such that the knife 71 is in retracted position, that is the arm 72 is at a low point on the cam 74 whenever the knotter is in idle position. As the knotter is operated the cam 74 is also operated to actuate the knife 71 in opposition to the spring 75 to cut the twine a short distance from the end of the movable clamp on the swinging arm, leaving the end of the twine projecting beyond the swinging arm a sufficient distance to be engaged by the stationary clamp on the next operation.

Operation of the lever 42 is controlled in part by the lever 14. A latch 76 (Fig. 1) is pivoted to the rib 19 and normally engages a shoulder 77 on the lever 42, being held in such position by an extension 78 on the latch engaging the lever 14 as shown. During the final operation of the inward movement of the lever 14 the extension 78 enters a notch 79 permitting the latch to be disengaged from the lever 42 by a cam 80 on the lever 14 contacting with said latch. Obviously, as the levers 14 and 42 are returned to their normal positions by their springs 20 and 54, the latch 76 will be engaged with the shoulder 77.

A full stroke device is provided for the lever 42 so as to require complete or full extent of movement thereof. As shown, said device comprises a bifurcated pivoted pawl 81 (Fig. 1) having its arms embracing one end of the spring 40 and having its pointed end arranged to escape over teeth 82 on the adjacent end of the lever 42. In the outward position of the lever 42 the end of the pawl 81 is beyond the inner end of the teeth 82 so that the lever 42 can be pressed inwardly but will be prevented from returning until it has been moved inwardly a sufficient distance to disengage the last one of the teeth 82 from the end of the pawl. This will permit the pawl 81 to escape over the teeth 82 as the lever 42 moves outwardly. All of the parts then return to the positions shown in solid lines in Fig. 1.

From the foregoing it will be seen that the invention efficiently obtains all of its intended objects and purposes. It is a genuine convenience for use in tying up vines of various kinds and may be also used for tying packages or bundles.

It is obvious that numerous variations may be made in the construction and arrangement of the parts of the machine without departure from the nature and principle of the invention. I do not restrict myself unessentially in any particular, but what I claim and desire to secure by Letters Patent, is:—

1. A portable machine of the character described, comprising a handle, a stationary clamp in connection with the handle arranged to engage and hold the end portion of a piece of twine, an arm pivoted to the handle, a clamp in connection with the arm, means in connection with the handle for operating said arm and the clamp in connection therewith to insert the end of the twine in the stationary clamp, a knotter supported by the handle, and manual means for operating the knotter to tie the twine.

2. A portable machine of the character described, comprising a handle, a stationary clamp in connection with the handle arranged to engage and hold the end portion of a piece of twine, an arm pivoted to the handle, a clamp in connection with the arm, means in connection with the handle for operating said arm and the clamp in connection therewith to insert the end of the twine in the stationary clamp, a knotter supported by the handle, manual means for operating the knotter to tie the twine, and means for cutting the twine between the knotter and the stationary clamp.

3. A machine of the character described, comprising a portable handle, a stationary clamp supported by the handle, an arm pivoted to the handle, a device supported by said arm for inserting the end of a piece of twine in to the stationary clamp, a lever supported by the handle for operating said arm, a knotter supported by the handle, and mechanism supported by the handle for operating said knotter.

4. A machine of the character described, comprising a portable handle, a stationary clamp supported by the handle, an arm pivoted to the handle, a device supported by said arm for inserting the end of a piece of twine into the stationary clamp, a lever supported by the handle for operating said arm, a knotter supported by the handle, mechanism supported by the handle for operating said knotter, and means for severing the twine between the knotter and the stationary clamp.

5. A machine of the character described, comprising a portable handle, a stationary clamp supported by the handle, an arm pivoted to the handle, a device supported by said arm for inserting the end of a piece of twine into the stationary clamp, a lever supported by the handle for operating said arm, a knotter supported by the handle, mechanism supported by the handle for operating said knotter, and a device controlled by said lever for determining when the knotter may be operated.

6. A machine of the character described, comprising a handle, a stationary clamp supported by the handle for engaging the end of a piece of twine, a device pivotally supported by the handle for moving the twine into engagement with the clamp, a lever supported by the handle for operating said device, a knotter supported by the handle for tying the twine, an additional lever supported by the handle for operating the knotter, a full-stroke device for said additional lever, and means controlled by the first-named lever determining when said additional lever may be operated.

7. A machine of the character described, comprising a handle, a stationary clamp supported by the handle for engaging the end of a piece of twine, a device pivotally supported by the handle for moving the twine into engagement with the clamp, a lever supported by the handle for operating said device, a knotter supported by the handle for tying the twine, an additional lever supported by the handle for operating the knotter, a full-stroke device for said additional lever, means controlled by the first-named lever determining when said additional lever may be operated, a knife for cutting the twine between the knotter and said clamp, and means for operating said knife.

8. A machine of the character described, comprising a handle, an arm extending from one end of the handle, a knotter supported by said arm, a pivoted arm supported by the handle, a clamp device on the pivoted arm for engaging twine, a lever supported by the handle, connections from said lever for operating said pivoted arm to move the twine to position for engagement by the knotter, an additional lever supported by the handle, and connections operated by said additional lever for operating the knotter.

9. A machine of the character described, comprising a portable frame, a handle for engagement in carrying the frame, a stationary clamp supported by the frame, a device supported by the frame for moving a piece of twine into engagement with the stationary clamp, means supported by the handle for operating said device, a lever supported by the handle, a knotter supported by the frame, devices operated by said lever for operating the knotter while the twine is in engagement with said clamp, and a knife for cutting the twine between the knotter and the clamp.

10. A machine of the character described, comprising a manually portable frame, a stationary clamp supported by the frame, means for increasing or reducing the clamping power of the clamp, a device for moving the end of a piece of twine into engagement with said clamp at the time the power of the clamp is increased, a spring for moving said device away from the clamp to leave the end of the twine in engagement with the clamp, a knotter for tying the twine, and means for operating the knotter.

11. A machine of the character described, comprising a manually portable frame, a stationary clamp supported by the frame, means for increasing or reducing the clamping power of the clamp, a device for moving the end of a piece of twine into engagement with said clamp at the time the power of the clamp is increased, a spring for moving said device away from the clamp to leave the end of the twine in engagement with the clamp, a knotter for tying the twine, means for operating the knotter, a knife arranged to cut the twine between the knotter and the clamp, and a cam for operating the knife.

12. A machine of the character described, comprising a handle, an arm extending from one end of the handle, a knotter supported by said arm, a pivoted arm supported by the handle, a clamp device on the pivoted arm for engaging twine, a lever supported by the handle, connections from said lever for operating said pivoted arm to move the twine to position for engagement by the knotter, an additional lever supported by the handle, connections operated by said additional lever for operating the knotter, a knife pivotally supported by said first-named arm, and means for operating said knife to cut the twine.

13. A machine of the character described, comprising a handle, an arm extending from one end of the handle, a clamp supported by said arm, a knotter supported by said arm, a pivoted arm supported by the handle, a clamp supported by the pivoted arm for engaging twine, a lever supported by the handle, connections from said lever for operating said pivoted arm to move the twine into engagement with the clamp on the first named arm, an additional lever supported by the handle, connections operated by said additional lever for operating the knotter to tie the twine, and means operated by said first-named lever for controlling the tension of the clamp on said first named arm.

14. A machine of the character described, comprising a manually portable frame, mechanism supported at one end of the frame for placing a piece of twine in position for use, a lever supported by the frame for tying the twine after it has been placed in position for use, gearing for operating the knotter, an additional lever, devices controlled by the additional lever for operating said gearing, and means for preventing incomplete operation of said additional lever.

15. A machine of the character described, comprising a handle, an arm extending from one end of the handle, a clamp supported by said arm, a knotter supported by said arm, a pivoted arm supported by the handle, a clamp supported by the pivoted arm for engaging twine, a lever supported by the handle, connections from said lever for operating said pivoted arm to move the twine into engagement with the clamp on the first named arm, an additional lever supported by the handle, connections operated by said additional lever for operating the knotter to tie the twine, means operated by said first-named lever for controlling the tension of the clamp on said first named arm, a knife for cutting the twine between the knotter and the first named clamp, and means operated by said second lever for operating said knife after the twine has been tied.

16. A machine of the character described, comprising a handle, an arm extending from one end of the handle, a clamp supported by said arm, a knotter supported by said arm, a lever supported by the handle, connections from said lever for operating the knotter, connections from said lever for varying the clamping tension of said clamp, a pivoted arm supported by the handle, a clamp on the end of the pivoted arm for engaging twine, an additional lever supported by the handle, connections from said additional lever for operating said pivoted arm to move said clamp on said pivoted arm to position to cause the first named clamp to engage the twine, and means for moving said pivoted arm to its starting position.

HENRY C. MEYER.